United States Patent
Hirche et al.

(10) Patent No.: US 8,915,163 B2
(45) Date of Patent: Dec. 23, 2014

(54) STEERING COLUMN LOCK

(71) Applicant: Volvo Car Corporation, Goeteborg (SE)

(72) Inventors: Mark Hirche, Hisings Kaerra (SE);
Martin Eliasson, Landvetter (SE);
Tomas Magnusson, Goetebord (SE);
Jenny Johansson, Goetebord (SE)

(73) Assignee: Volvo Car Corporation (SE)

( * ) Notice: Subject to any disclaimer, the term of this patent is extended or adjusted under 35 U.S.C. 154(b) by 80 days.

(21) Appl. No.: 13/739,527

(22) Filed: Jan. 11, 2013

(65) Prior Publication Data
US 2013/0174686 A1 Jul. 11, 2013

(30) Foreign Application Priority Data
Jan. 11, 2012 (EP) ..................................... 12150699

(51) Int. Cl.
*B62D 1/18* (2006.01)
*B62D 1/181* (2006.01)
*B60R 25/0215* (2013.01)
*B62D 1/183* (2006.01)

(52) U.S. Cl.
CPC .......... *B62D 1/181* (2013.01); *B60R 25/02153* (2013.01); *B62D 1/183* (2013.01)
USPC ............... 74/493; 74/492; 280/771; 280/775; 280/776

(58) Field of Classification Search
CPC .............. B60R 25/02; B60R 25/02147; B60R 25/02134; B60R 25/02156; B60R 25/02153; B62D 1/181; B62D 1/183
USPC ...................... 74/492, 493; 280/771, 775, 776
See application file for complete search history.

(56) References Cited

U.S. PATENT DOCUMENTS

| | | | |
|---|---|---|---|
| 5,813,699 A | 9/1998 | Donner et al. | |
| 7,714,459 B2 | 5/2010 | Hirche et al. | |
| 2004/0144192 A1 | 7/2004 | Tomaru et al. | |
| 2005/0097978 A1* | 5/2005 | Rhouma et al. | 74/492 |
| 2009/0133452 A1* | 5/2009 | Hirche et al. | 70/183 |
| 2011/0210536 A1* | 9/2011 | Monteil et al. | 280/775 |
| 2011/0308348 A1* | 12/2011 | Ichie et al. | 74/493 |

FOREIGN PATENT DOCUMENTS

| | | |
|---|---|---|
| DE | 102005027777 A1 | 12/2006 |
| DE | 102006059282 A1 | 6/2008 |

OTHER PUBLICATIONS

Extended European Search Report Dated Jun. 28, 2012, Application No. 12150699.2-1523, Applicant Volvo Car Corporation, 6 pages.

* cited by examiner

*Primary Examiner* — Faye M Fleming
*Assistant Examiner* — Darlene P Condra
(74) *Attorney, Agent, or Firm* — Brooks Kushman P.C.

(57) ABSTRACT

A steering column arrangement for a vehicle comprises a first portion rotatably supported by a second portion. The steering column arrangement further comprises a first electrical motor that is adapted to be operably connected to a vehicle control system. The steering column is arranged to be moved laterally and/or axially by the first electric motor. The steering column arrangement further comprises locking means arranged to lock the steering column thereby preventing rotation of the steering column. The locking means comprise a first locking member attached to the steering column and a second locking member arranged to be attached to the vehicle chassis, where the first electric motor is arranged to move the steering column to a locked position in which the first locking member and the second locking member are arranged to engage, thereby preventing rotation of the steering column.

18 Claims, 2 Drawing Sheets

STEERING COLUMN LOCK

CROSS-REFERENCE TO RELATED APPLICATIONS

This application claims foreign priority benefits under 35 U.S.C. §119(a)-(d) to European patent application number EP 12150699.2, filed Jan. 11, 2012, which is incorporated by reference in its entirety.

TECHNICAL FIELD

The disclosure relates to a steering column for a vehicle, a method for locking a steering column, and a vehicle comprising a steering column.

BACKGROUND

Today legal requirements require a locking of steering, transmission and/or brake to secure cars against for instance theft or other unauthorised usages and rollaway. Steering columns today mostly use locking devices for locking of the steering column which requires space along the steering column axis. This space is vital to have for other possibilities such as a knee-airbag or as a collapse area for the column in case of crashes to name a few.

One example of a locking device for locking a steering column is disclosed in DE 200510027777. Here the locking device is located next to the steering column and attached to the steering column. A locking bolt can be displaced into the steering column in order to lock the steering column. The movement of the locking bolt is controlled by an electronic control unit. As mentioned above, such an arrangement takes up space along the steering column axis. These locking devices are also expensive and may apart from taking up space add to the total weight of the car.

There is thus a need for an improved steering column that addresses the above mentioned problems.

SUMMARY

An object of the present disclosure is to provide an inventive steering column for a vehicle where the previously mentioned problems are at least partly avoided.

A steering column arrangement, according to the present disclosure, for use with a vehicle may comprise a steering column including a steering shaft rotatably supported by an outer column. The steering column arrangement further comprises a first electrical motor operably connected to the vehicle control system. The steering column is arranged to be moved laterally and/or axially by the first electric motor. The steering column arrangement further comprises locking means arranged to lock the steering column thereby preventing rotation of the steering column. The locking means comprise a first locking member attached to the steering column and a second locking member arranged to be attached to the vehicle chassis. The first electric motor is arranged to move the steering column to a locked position in which the first locking member and the second locking member are arranged to engage, thereby preventing rotation of the steering column. A method for locking a steering column according to the disclosure is also provided.

As mentioned above, today's locking devices for locking steering columns require space along the steering column axis. With the introduction of electrically adjustable steering columns, electrical motors have been put into place for controlling the position of the steering column. These electrical motors can be used to move the steering column to a position where the steering column is locked. This is realized by having a first locking member attached to the steering column itself and a second locking member arranged to be attached to the vehicle chassis. The electric motors that control the position of the steering column are connected to the vehicle control system such that during certain circumstances the steering column will move to or from a locked position from or to an operable position. These circumstances will be described below in more detail. The operable position is a position in which the steering column is unlocked and the position is adjusted for driving.

The advantage with using electric motors that are already in place is that no extra equipment has to be installed along the axis of the steering column. By attaching locking means to the steering column itself the space that usually is occupied by prior art locking devices can be used for other important systems. Also weight is saved as the prior art locking device is no longer necessary.

The first locking member may for instance be a locking ring attached to the steering column or locking grooves that are cut out in the steering column. The second locking member may for instance be a locking bolt, a locking pin or another kind of member that can be used as a second part in a locking means for engaging with the first locking member.

The second locking member is arranged to be attached to the chassis. This means that the second locking member may be attached directly to the chassis or that it may be attached to a different part of the vehicle that is in turn attached to the chassis.

The locked position of the steering column may be located outside a normal adjustment range for the steering column.

One advantage with a steering column arrangement according to the present disclosure is the possibility to define a not-used position of the electrical adjustable steering column and use a locking mechanism which then locks the steering column in one desired position. This ensures that the steering column does not lock during ordinary adjustment of the steering column. The normal adjustment range may be set by programming the vehicle control system in such a way that the locked position cannot be reached by manually adjusting the position of the steering column. Alternatively a mechanical lock can be used to hinder the steering column from reaching the locked position during manual adjustment. The mechanical lock is controlled by the vehicle control system and is disengaged when the steering column is to be moved to the locked position.

The first locking member attached to the steering column may cover the entire circumference of the steering column.

As mentioned above the first locking member may be a locking ring or grooves cut out in the steering column. The ring or the grooves may cover the entire circumference of the steering column in order to be able to lock the steering column in any position, i.e., the locking may take place independent of how the steering wheel is positioned. This may be useful when for instance parking on a slope since the wheels and in turn the steering wheel may be positioned in any position necessary.

The first locking member may cover a part of the circumference of the steering column.

The locking ring or grooves may also cover only a part of the circumference of the steering column. This can be used as an alternative when it is deemed that a sufficient functionality is achieved using only a part of the circumference of the steering column. This may lead to a lower weight or an easier manufacturing.

The second locking member may comprise a locking bolt. The second locking member may also comprise a locking pin or another suitable second locking member.

The locking bolt may be arranged to be resiliently attached to the chassis of the vehicle.

This allows the steering column to be moved into place such that when a locking position is reached, the locking bolt springs into place engaging with the first locking member. Instead of a locking bolt, a locking pin or another suitable second locking member may be arranged to be resiliently attached to the chassis.

The locking bolt may be attached such that the locking bolt is resilient in a downward and/or upward direction essentially parallel to a longitudinal axis of the steering column.

The vehicle control system may move the steering column from an operable position to said locked position after at least one of: turning the ignition switch from the "on" position, the ignition key is removed from the ignition lock, the central lock of the vehicle is activated, the vehicle alarm is triggered, or when a crash is detected by the vehicle control system.

One advantage with the steering column arrangement according to the disclosure is that it is possible to arrange for the steering column to move to said locked position under a number of circumstances. The steering column may for instance move to the locked position when the ignition switch is moved from the "on" or "II" position to a position other than the "start" position of the ignition switch. A further possibility for the steering column to move to said locked position is when the key is removed from the ignition lock. Both of the above options allow for easy exit of the vehicle as the steering wheel is moved out of the way from the driver when the driver exits the vehicle. This could present an advantage for elderly drivers or other drivers that are physically impaired or disabled. A position different from said locked position may be possible if more suitable for easy exit. The steering column would then move to said locked position after for instance the central lock of the vehicle is activated.

It may also be possible to arrange for the steering column to move to said locked position when the central lock of the vehicle is activated. This can be done either by locking the doors using a lock on one of the doors or using the electronic central lock.

Another possibility is for the steering column to move to said locked position when the vehicle alarm is triggered during an attempt to enter the vehicle unlawfully. This would hinder a thief from driving away with the vehicle.

Yet another possibility is for the steering column to move to said locked position when a crash is detected. This would increase the safety of the passenger as the collapse of the steering wheel during the crash may be controlled using the electric motors. It is of course possible for the steering wheel to move to a different position than said locked position after a crash is detected if such a position is more suitable from a safety perspective.

The vehicle control system may move the steering column from said locked position to an operable position after at least one of: the ignition key is inserted in the ignition lock, turning the ignition switch to the "on" or "start" position, or the central lock of the vehicle is deactivated.

Another advantage with the steering column arrangement according to the disclosure is that it is possible to arrange for the steering column to move from said locked position to an operable position under a number of circumstances. The steering column may for instance move from the locked position when the ignition switch is moved to the "on" or "II" position. A further possibility for the steering column to move from said locked position is when the key is inserted in the ignition lock. Both of the above options allow for easy entry of the vehicle as the steering wheel is moved out of the way from the driver when the driver enters the vehicle. The steering column moves to the operable position after the driver is positioned correctly in the seat. This presents an advantage for elderly drivers or other drivers that are physically impaired or disabled. A position different from said locked position may be possible if more suitable for easy entry. The steering column would then move from the locked position to this alternative position after for instance the central lock of the vehicle is de-activated.

It may also be possible to arrange for the steering column to move from said locked position when the central lock of the vehicle is de-activated. This can be done either by unlocking the doors using a lock on one of the doors or using the electronic central lock to unlock the vehicle.

The steering column may comprise an inner column and an outer column, the outer column and the inner column being arranged such that they can move telescopically relative to each other.

The first electric motor may be any motor suitable for operating a steering column.

Motors of the adjustable steering column locks can be put in a position such that contacts are not accessible, so that the Thatcham Attack requirements are fulfilled. Additionally, motors such as a brushless DC motor further complicates for a thief to steal the car.

A vehicle may comprise a steering column arrangement according to the disclosure. The vehicle may comprise at least two wheels.

The disclosure is not limited to vehicles having four wheels such as a car but may also be used for motorcycles. The position of the electrical motors and the type of motors will of course have to be adapted depending on the type of vehicle such that theft prevention is maximized.

The disclosure further relates to a method for locking a steering column where the steering column comprises a steering shaft rotatably supported by the steering column. The steering column further comprises a first electrical motor, the first electrical motor being operably connected to the vehicle control system. The steering column is arranged to be moved laterally and/or axially by the first electric motor. The steering column further comprises locking means arranged to lock the steering column thereby preventing rotation of the steering column. The locking means comprises a first locking member attached to the steering column and a second locking member arranged to be attached to the vehicle chassis. The method comprises:

moving the steering column to a locked position using the first electric motor;

engaging the first locking member and the second locking member thereby preventing rotation of the steering column.

Moving the steering column to the locked position can be done in any way as long as the first locking member and the second locking member engage. For instance the steering column can be retracted only horizontally until the second locking member engages with the first locking member. Alternatively the steering column can be tilted downwards, and then retracted backwards before being tilted upwards reaching the locked position. The locked position may be reached without the step of having to tilt the steering column upwards.

When moving the steering column from the locked position to the operable position the steering column may be moved horizontally outwards. Alternatively the steering column is first tilted down before moving outwards and tilting upwards reaching the operable position. The operable position may be reached without having to tilt the steering column upwards as a last step.

The method may also comprise:
moving the steering column to a locked position using the first electric motor, where the locked position is located outside a normal adjustment range for the steering column.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
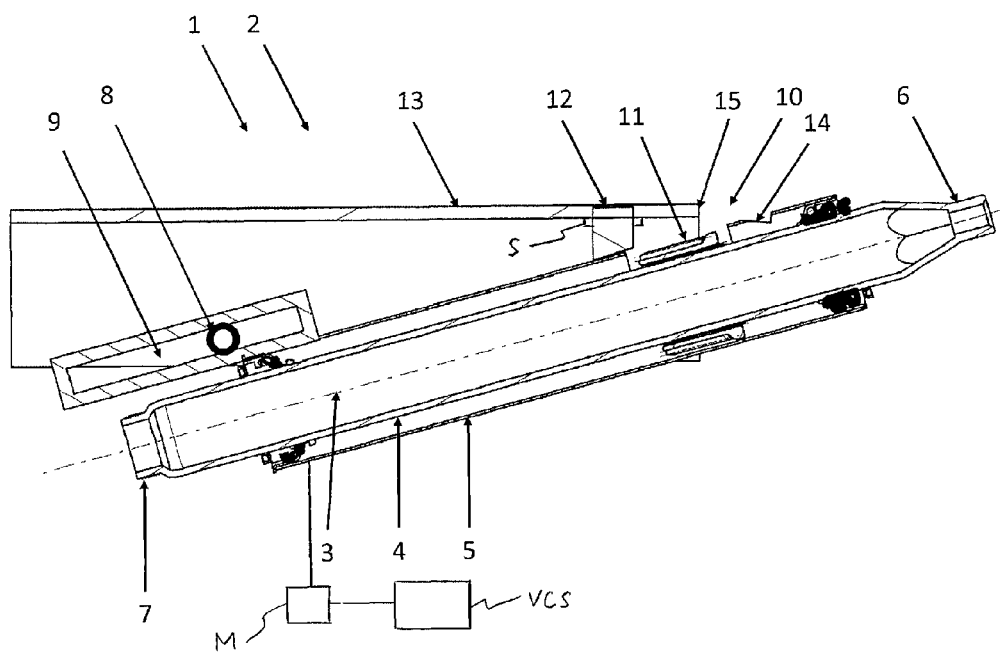
FIG. 1 schematically shows a side view of a steering column according to the present disclosure in an unlocked state.

FIG. 1 schematically shows a side view of a steering column 1 for a vehicle according to the present disclosure in an unlocked state. The steering column 1 comprises a steering shaft 2 rotatably supported by the steering column 1. The steering column is movable along a longitudinal axis 3 of the steering column 1 as well as horizontally and vertically. The movement of the steering column 1 takes place using one or more electric motors M (shown schematically in FIG. 1) connected to the vehicle control system VCS (also shown schematically in FIG. 1). Controls for the adjustment of the steering column 1 using the electric motors may for instance be positioned on or adjacent a steering wheel mounted on the steering column. The steering column 1 may comprise an inner column 4 and an outer column 5 where the outer column 5 and the inner column 4 are arranged such that they can move telescopically relative to each other. The entire steering column 1 may be pivotable upwards or downwards around a pivot point 8. In FIG. 1 the pivot point 8 is arranged in a sliding groove 9 in which it can be moved parallel to the longitudinal axis 3 of the steering column 1. This arrangement is intended as a mere example and is not to be seen as limiting for the disclosure.

A first end 6 of the steering column 1 may be connected to a steering wheel (not shown). A second end 7 of the steering column 1 may be arranged to be connected to at least one wheel, usually two. This arrangement is not shown in more detail and is considered to be known to the skilled person.

The steering column 1 further comprises a locking device or means 10 comprising a first locking member 11 and a second locking member 12. The first locking member 11 is arranged on the inner column 4 and may be a locking ring or grooves cut into the inner column 4. The first locking member 11 may cover the entire circumference of the inner column 4 or only a part of the inner column 4. The second locking member 12 is arranged to be attached to the chassis of the vehicle, in FIG. 1 this is illustrated by the console 13 to which the second locking member 12 is attached. The console 13 may for instance be a part of the chassis or a part of the dashboard that is securely attached to the chassis which is not easily reached from the interior of the vehicle or from the engine room of the vehicle to prevent unwanted tampering of the second locking member 12. This arrangement is intended as a mere example and is not to be seen as limiting for the disclosure. The second locking member 12 is arranged to be resiliently attached to the chassis. This may be done by means of a spring S (shown schematically in FIG. 1) which enables the second locking member 12 to be resiliently movable in a direction upwards and/or downwards, where the upwards or downwards direction is essentially parallel to the longitudinal axis 3 of the steering column 1. This means that the second locking member 12 can be displaced when the steering column 1 moves and that the second locking member 12 snaps into place when the steering column 1 has reached the locked state.

The steering column 1 further comprises a covering groove 14 intended to engage with an edge 15 of the chassis or dashboard. This results in that the locking means 10 are invisible to someone trying to steal the car when the steering column is in a locked position. The covering groove 14 also ensures that the locking means 10 cannot be tampered with without having to cause damage to the chassis or dashboard to gain access to the locking means 10 resulting in that theft becomes more difficult and that the car will be easily identified as stolen.

Figure 2:
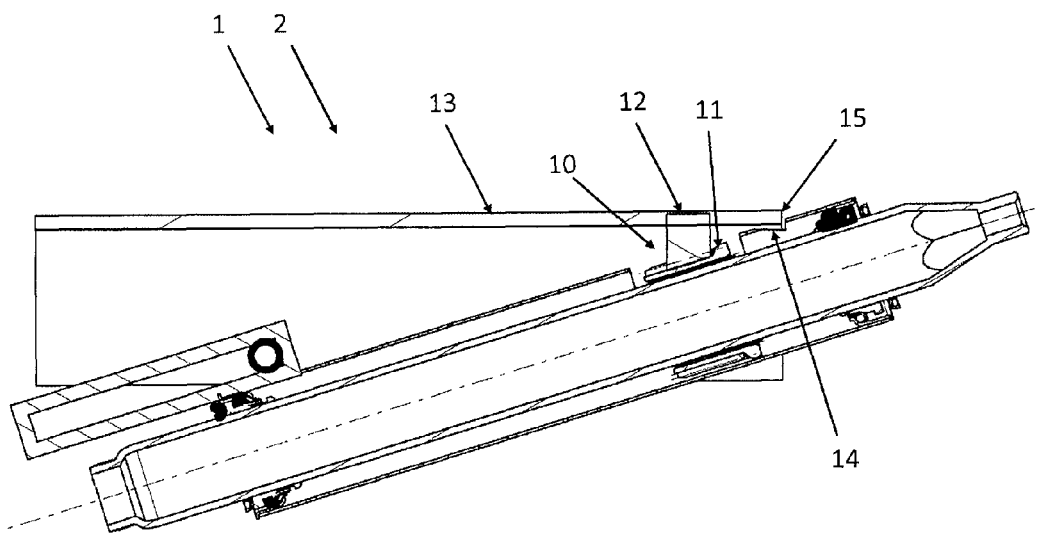
FIG. 2 schematically shows a side view of a steering column according to the present disclosure in a locked state.

FIG. 2 schematically shows a side view of a steering column 1 according to the disclosure in a locked state. The steering column 1 has moved to a locked state resulting in that the second locking member 12 has engaged with the first locking member 11. In FIG. 2 it can also be seen that the covering groove 14 has engaged with the edge 15 of the console 13.

Reference signs mentioned in the claims, if any, should not be seen as limiting the extent of the matter protected by the claims, and their sole function is to make claims easier to understand.

As will be realized, the disclosure is capable of modification in various obvious respects, all without departing from the scope of the appended claims. Accordingly, the drawings and the description thereto are to be regarded as illustrative in nature, and not restrictive.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A steering column arrangement for a vehicle having a vehicle control system and a vehicle chassis, the steering column arrangement comprising:
   a steering column;
   a first electric motor being adapted to be operably connected to the vehicle control system for moving the steering column laterally and/or axially; and
   locking means arrangeable to lock the steering column to thereby prevent rotation of the steering column, the locking means comprising a first locking member attached to the steering column and a second locking member arranged to be attached to the vehicle chassis, the second locking member comprising a locking bolt that is resiliently attachable to the vehicle chassis such that the locking bolt is resiliently movable in a downward direction and/or upward direction essentially parallel to a longitudinal axis of the steering column;

wherein, when the steering column arrangement is mounted in the vehicle, the first electric motor is arranged to move the steering column to a locked position in which the first locking member and the second locking member are arranged to engage to thereby prevent rotation of the steering column.

2. The steering column arrangement according to claim 1 wherein the locked position of the steering column is located outside a normal adjustment range for the steering column.

3. The steering column arrangement according to claim 1 wherein the steering column has a circumference, and the first locking member covers the entire circumference of the steering column.

4. The steering column arrangement according to claim 1 wherein the steering column has a circumference, and the first locking member covers a part of the circumference of the steering column.

5. The steering column arrangement according to claim 1 wherein the steering column is adapted to be moved by the vehicle control system from an operable position to the locked position after at least one of: turning an ignition switch from an "on" position, a central lock of the vehicle is activated, a vehicle alarm is triggered, a crash is detected by the vehicle control system or an ignition key is removed from an ignition lock of the vehicle.

6. The steering column arrangement according to claim 1 wherein the steering column is adapted to be moved by the vehicle control from the locked position to an operable position after at least one of: an ignition key is inserted in an ignition lock of the vehicle, turning an ignition switch to an "on" or "start" position, or a central lock of the vehicle is deactivated.

7. The steering column arrangement according to claim 1 wherein the steering column comprises an inner column and an outer column, the outer column and the inner column being arranged such that they are movable telescopically relative to each other.

8. The steering column arrangement according to claim 1 wherein the first electric motor comprises a brushless DC motor.

9. The steering column arrangement according to claim 1 wherein the steering column comprises an inner column and an outer column, and the inner column is rotatably supported by the outer column.

10. A vehicle comprising the steering column arrangement according to claim 1.

11. The vehicle according to claim 10 wherein the vehicle comprises at least two wheels.

12. A method for locking a steering column of a vehicle, the method comprising:
moving the steering column to a locked position using a first electric motor, wherein the first motor is operable to move the steering column laterally and/or axially; and
engaging a first locking member, which is attached to the steering column, and a second locking member, which is attached to the vehicle, thereby preventing rotation of the steering column;
wherein the second locking member is resiliently attached to the vehicle such that the second locking member is resiliently movable in a downward direction and/or upward direction essentially parallel to a longitudinal axis of the steering column.

13. The method according to claim 12 wherein the locked position is located outside a normal adjustment range for the steering column.

14. The method according to claim 12 wherein the first electric motor is operably connected to a vehicle control system.

15. The method according to claim 12 wherein the second locking member comprises a locking bolt.

16. A steering column arrangement for a vehicle, the steering column arrangement comprising:
a steering column;
at least one electric motor for moving the steering column laterally and/or axially; and
a locking device arrangeable to lock the steering column to thereby prevent rotation of at least a portion of the steering column, the locking device comprising a first locking member attached to the steering column and a second locking member resiliently attachable to the vehicle such that the second locking member is resiliently movable in a downward direction and/or upward direction essentially parallel to a longitudinal axis of the steering column;
wherein, when the steering column arrangement is mounted in the vehicle, the at least one electric motor is operable to move the steering column to a locked position in which the first locking member is engageable with the second locking member to thereby prevent rotation of the at least a portion of the steering column.

17. The steering column arrangement of claim 16 wherein the steering column comprises a first portion rotatably supported by a second portion.

18. The steering column arrangement of claim 16 wherein the second locking member comprises a locking bolt.

* * * * *